United States Patent [19]
Francois

[11] Patent Number: 4,749,388
[45] Date of Patent: Jun. 7, 1988

[54] DEVICE FOR DRYING MOIST AIR

[75] Inventor: Alfred François, Brussels, Belgium

[73] Assignee: Solvay & Cie. (Société Anonyme), Brussels, Belgium

[21] Appl. No.: 7,975

[22] Filed: Jan. 29, 1987

[30] Foreign Application Priority Data

Jan. 30, 1986 [BE] Belgium .................. 0/216205

[51] Int. Cl.⁴ ............................................. B01D 53/14
[52] U.S. Cl. ......................................... 55/221; 55/35; 55/388
[58] Field of Search ..................... 55/35, 221, 316, 388

[56] References Cited

U.S. PATENT DOCUMENTS

| | | | |
|---|---|---|---|
| 2,363,262 | 11/1944 | Robinson | 55/221 |
| 2,535,144 | 12/1950 | Kovacs et al. | 55/221 |
| 2,922,488 | 1/1960 | Bruner | 55/316 |
| 3,221,478 | 12/1965 | Norton | 55/388 X |
| 3,248,861 | 5/1966 | Lovercheck | 55/388 X |
| 3,392,511 | 7/1968 | King | 55/388 |
| 4,064,876 | 12/1977 | Mulchi | 55/316 X |

Primary Examiner—Charles Hart
Attorney, Agent, or Firm—Spencer & Frank

[57] ABSTRACT

Device for drying moist air, comprising, in an enclosure (1) provided with openings (5, 6) for the admission and removal of air, a receptacle (10) for a solid desiccant and, under the latter, a layered structure (19) of superposed mats of a filter medium.

10 Claims, 4 Drawing Sheets

DEVICE FOR DRYING MOIST AIR

The invention relates to a device for drying air.

There are known devices for drying air in premises, in which the air is made to travel in an enclosure, in contact with a charge of calcium chloride in particulate form (Belgian Pat. No. 825,611 - SOLVAY & Cie). In these known devices the moist air which is treated relinquishes its moisture to the calcium chloride charge, and this gives rise to a gradual formation of an aqueous solution of calcium chloride, which is removed.

To improve the efficiency of these devices, consideration has been given to bringing the moist air into contact with the aqueous solution of calcium chloride before it is conveyed onto the charge of solid calcium chloride. Devices designed for this purpose incorporate a vertical column of the scrubber type, containing a packing of Raschig rings under the calcium chloride charge. The air to be treated is introduced at the base of the column, passes through the packing, countercurrentwise to the calcium chloride solution, and then travels in contact with the calcium chloride charge (Chimie et Industrie, vol. 38, No. 1, July 1937 - SOLVAY & Cie "Gas drying using calcium chloride", page 4).

The objective of the invention is to further improve the efficiency and the output of the devices for drying air.

It has been found that this objective can be achieved when the Raschig rings packing in the known devices described above is replaced with a packing material of a particular design.

The invention consequently relates to a device for drying moist air, comprising, in an enclosure provided with openings for the admission and removal of air, a receptacle for a solid desiccant and an air- and liquid-permeable packing material arranged under the receptacle; according to the invention, the packing material is a layered structure consisting of several individual, horizontal, superposed mats made of a filter medium.

The receptacle in the device according to the invention should be designed so as to allow the air to be dried to travel in contact with the desiccant. The desiccant should be chosen from those which are capable of forming aqueous solutions with atmospheric moisture. Desiccants which are especially suitable are alkali and alkaline-earth metal chlorides and alkali metal hydroxides. Calcium chloride and sodium hydroxide are preferred.

The external shape of the enclosure is not critical. For example, the latter may consist of a vertical cylindrical tube which contains the receptacle with the desiccant in its upper part and the packing material in its lower part.

The openings for the admission of air into the enclosure should be arranged below the packing material and the openings for the removal of air should be arranged in the upper part of the enclosure, so that the air flows through the enclosure upwards, first vertically through the packing material and then in contact with the desiccant.

The device is usually fitted with a fan to ensure a forced upward flow of air in the enclosure.

According to the invention, the packing material consists of several individual mats of a filter medium, the mats being superposed horizontally so that they form a layered structure.

The optimum number of mats depends on various factors, particularly the size of the device, the nature of the desiccant, the filter medium and the permeability of the mats. It has to be investigated in each individual circumstance.

The filter medium should be chemically inert towards the aqueous solutions of the desiccant. It may be, for example, an open-cell expanded cellular material such as a polyurethane or polystyrene foam. A fibrous material is preferred; it may be an inorganic material, for example asbestos or glass fibres, or a polymeric organic material such as, for example, thermoplastic polymers chosen from polyolefins, polyesters, polyamides and their derivatives. Polyethylene and polypropylene are especially recommended. In the case of an organic polymeric material, the latter may be in the form of fibres or fibrils.

The term fibrils is intended to denote a specific structure of the polymeric material. Fibrils consist of an aggregate of a multitude of very slender filaments, of flaky appearance, which are joined together so as to form a three-dimensional network. Flock-like in appearance, the fibrillated aggregates are of an oblong shape; their length varies from 0.5 to approximately 50 mm and their diameter from a few microns to approximately 5 mm. They are characterized by a high specific surface, in excess of 1 $m^2/g$ and, in many cases, even of 10 $m^2/g$.

In the case where the fibrous organic polymeric material is in the form of fibres, it is preferable, according to the invention, to use fibres whose diameter is substantially between 0.1 and 25 microns; fibres with a diameter of between 1 and 15 microns are highly suitable.

In the case where the filter medium is a fibrous material, the latter may be in woven form.

In a preferred embodiment of the device according to the invention, the filter medium is in the form of entangled fibre flock or wadding. In an alternative form of this preferred embodiment of the device according to the invention, the layered structure comprises an alternation of mats of loose flock and mats of pressed flock. In this alternative form of the invention, the thickness of the mats of pressed flock and the thickness of the mats of loose flock are advantageously in a ratio of between 1:50 and 1:2, preferably between 1:20 and 1:10, at the same actual volume of fibrous material per unit area of the mats.

The layered structure in the device according to the invention generally rests on a horizontal grid which forms the bottom of the enclosure and determines the openings for the admission of moist air.

The receptacle containing the desiccant may, for example, incorporate a horizontal or sloping grid on which the desiccant is distributed in the form of a bed of lumps or of granules, as shown diagrammatically in the above-mentioned Belgian Pat. No. 825,611, so that air passes through it.

However, in a particular embodiment of the device according to the invention, it is preferred to arrange the desiccant in a series of individual pockets which have perforated walls and between which the air to be dried travels. In this embodiment of the invention, use is advantageously made of pockets of oblong shape which are suspended vertically under a lid closing the enclosure, through which the opening for the removal of the treated air is arranged.

In an advantageous embodiment of the device according to the invention a surface-active agent is mixed with the desiccant. The surface-active agent is chosen from those which are capable of lowering the surface tension of aqueous solutions of the desiccant in contact with the layered filtering structure. All else being equal, the device according to this embodiment of the invention has optimum efficiency and output.

The device according to the invention is suitable for drying moist air in any premises. It is particularly suitable for premises of large size, particularly for industrial workshops which require the environmental air to be of low relative humidity (anodizing and painting shops, printing shops, bakeries and the like) and leisure halls such as swimming pools, sports halls and dance halls.

Individual features and details of the invention will become apparent from the description of the attached drawings, which represent a particular embodiment of the device according to the invention.

In these figures, the same reference numbers indicate identical components.

Figure 1:
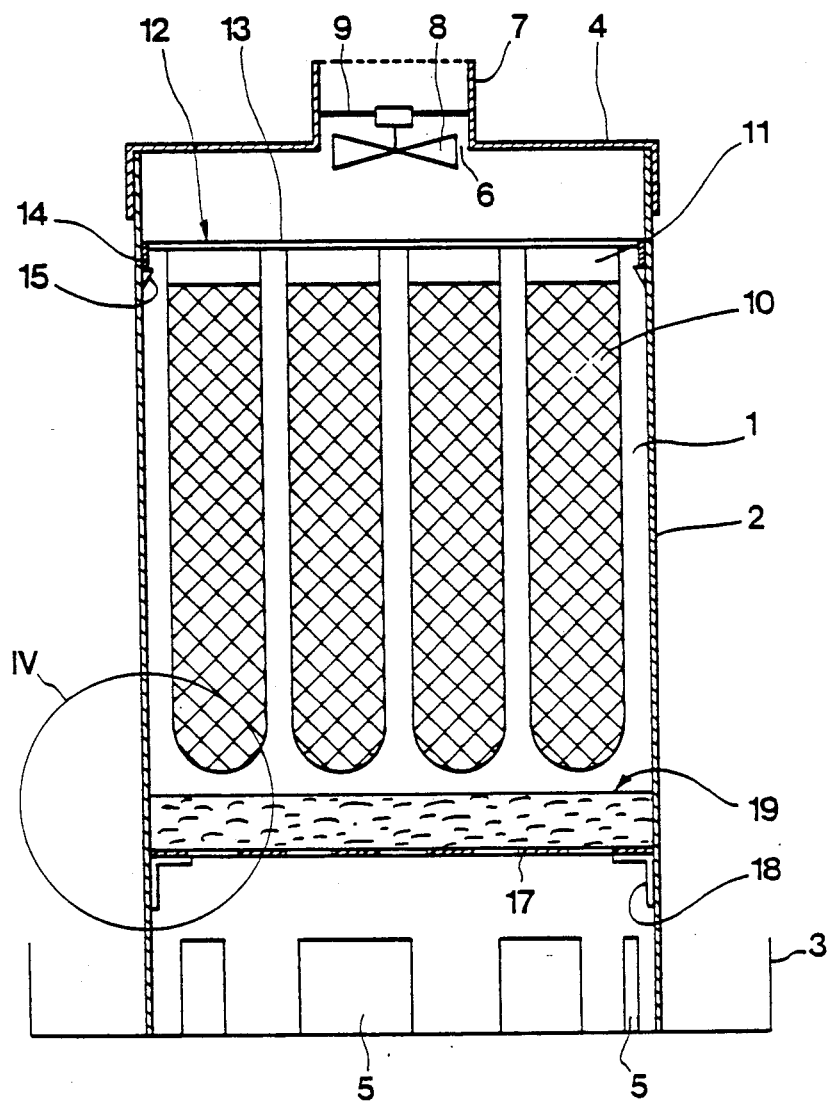
FIG. 1 shows a particular embodiment of the device according to the invention, in vertical axial section.

The device according to the invention, shown diagrammatically in FIG. 1, comprises an enclosure 1 defined by a vertical tubular wall 2 standing in a bowl 3 and closed with a removable lid 4.

The enclosure 1 is in communication with the environment by means of openings 5 which are arranged in the lower part of the tubular wall 2 and a central opening 6 in the lid, supporting a cylindrical stack 7. A fan 8, fastened to the stack 7 by means of struts 9, provides an upward travel of air in the enclosure 1.

Figure 3:
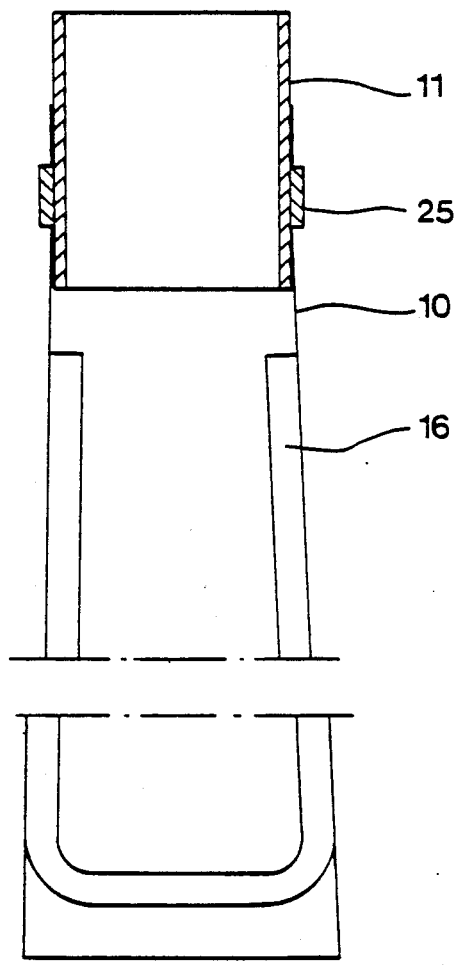
FIG. 3 shows, on a large scale, a detail of the device of FIG. 1, in vertical axial section.

A series of oblong vertical pockets 10, whose walls are perforated so as to form a lattice, contains calcium chloride in flake form. The pockets 10 are hung from rigid cylindrical sleeves 11 of a rigid framework 12, by means of clamping collars 25 (FIG. 3).

Figure 2:
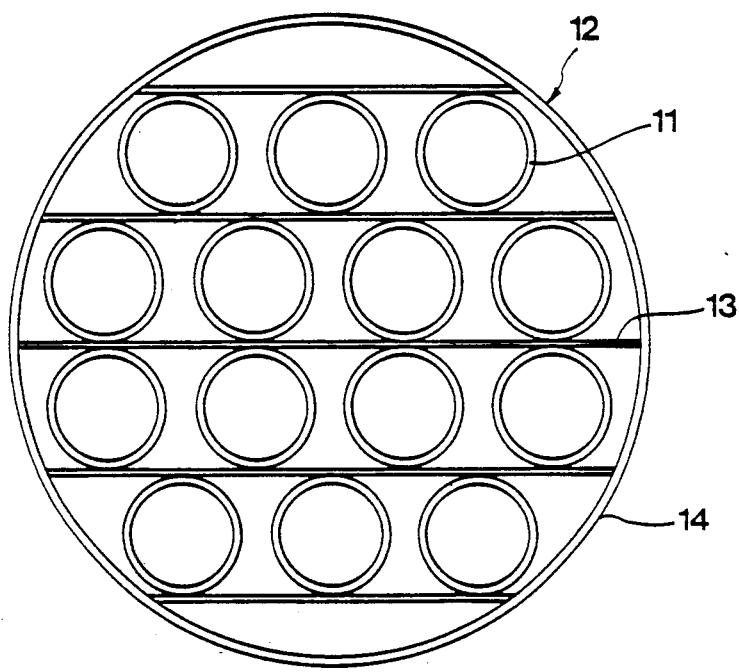
FIG. 2 is a horizontal section along the plane II—II of FIG. 1.

The framework 12 consists (FIG. 2) of an assembly of horizontal rods 13 which support the cylindrical sleeves 11 and are integrally fastened to a horizontal peripheral ring 14. The latter rests freely on supports 15 which are integrally fastened to the tubular wall 2.

The pockets 10 advantageously contain an internal stiffener consisting of a bent tube 16, the purpose of which is to stiffen the pockets in their oblong shape.

In its lower part, under the pockets 10, the enclosure 1 contains a horizontal grid 17 resting on supports 18 which are integrally fastened to the tubular wall 2. The grid 17 supports a packing material 19.

Figure 4:
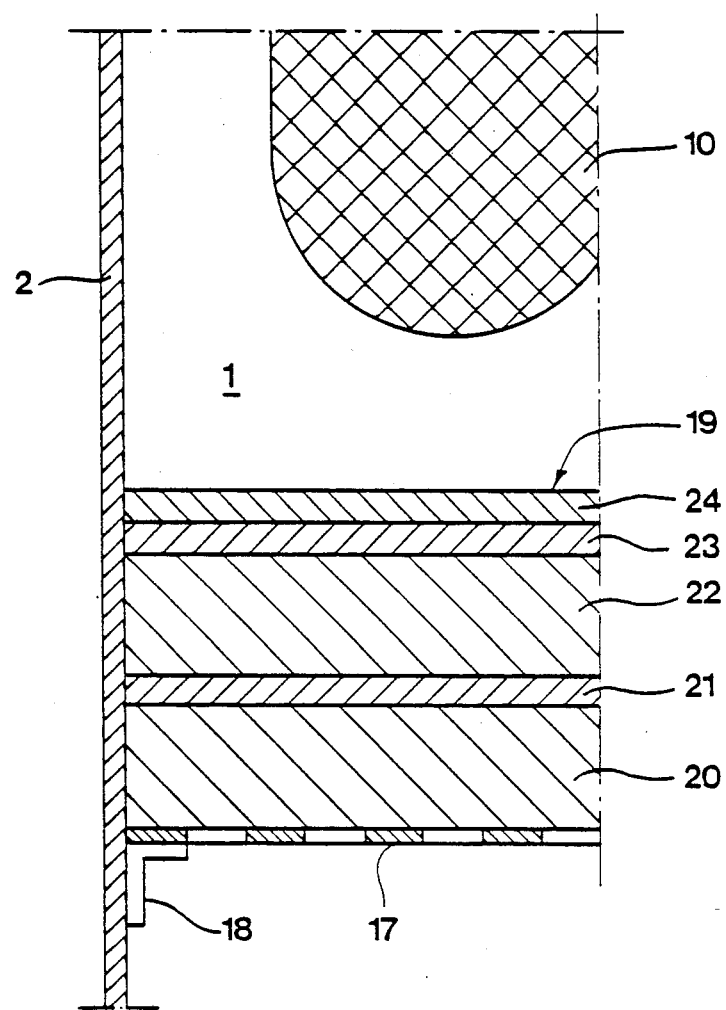
FIG. 4 shows, on a large scale, a detail indicated as IV in FIG. 1, in vertical axial section.

The packing material 19 is shown on a large scale in FIG. 4. According to the invention, it is of a layered structure, consisting of a superposition of five individual fibre mats, denoted by reference numbers 20, 21, 22, 23 and 24. Each of the mats consists of entangled polyethylene fibre flock or wadding. All the mats contain an approximately equal mass of fibres, but in the mats 21, 23 and 24, the flock is in a compressed state, whereas in the mats 20 and 22 it is in a loose state. The compression of the flock in the mats 21, 23 and 24 is regulated so that the thickness of each of these mats is approximately equal to one-quarter of the thickness of the mats of loose flock 20, 22.

In order to put the device shown in the figures into operation, the fan 8 is started up, the pockets 10 being filled with calcium chloride in the form of flakes or with another desiccant in particulate form. The environmental air enters the enclosure 1 via the openings 5, passes vertically through the mats 20, 21, 22, 23 and 24, and then travels along the pockets 10, where it relinquishes at least some of its moisture to the calcium chloride. The dried air leaves the enclosure 1 through the opening 6 and the stack 7, while the calcium chloride solution which is formed percolates through the mats and is collected in the bowl 3. During its passage through the mats 20, 21, 22, 23 and 24, the moist air travels countercurrentwise to the calcium chloride solution and relinquishes to it some of its moisture.

In order to promote the transfer of the atmospheric moisture to the calcium chloride solution, a surface-active agent is mixed with the calcium chloride flakes held in the pockets 10. The purpose of the surface-active agent is to lower the surface tension of the calcium chloride solution in contact with the fibres of the packing material 19.

I claim:

1. Device for drying moist air, comprising, in an enclosure (1) provided with openings (5, 6) for the admission and removal of air, a receptacle (10) for a solid desiccant and an air- and liquid-permeable packing material (19) arranged under the receptacle (10), characterized in that the packing material (19) is a layered structure consisting of several individual, horizontal, superposed mats made of a filter medium (20, 21, 22, 23, 24) constituted by entangled fiber flock, said mats resting upon one another whereby said solid desiccant forms a liquid solution which percolates through said entangled fiber flock mats as the moist air travels countercurrently through said entangled fiber flock mats.

2. Device according to claim 1, characterized in that the layered structure (19) comprises an alternation of mats of loose flock (20, 22) and mats of pressed flock (21, 23).

3. Device according to claim 2, characterized in that the thickness of the mats of pressed flock (21, 23) and the thickness of the mats of loose flock (20, 22) are in a ratio of between 1:20 and 1:10.

4. Device according to any one of claims 1, characterized in that the layered structure (19) rests on a grid (17) forming the bottom of the enclosure (1) and defining the abovementioned openings for the admission of air.

5. Device according to claim 4, characterized in that the layered structure (19) rests on the grid (17) by means of a mat of loose flock (20).

6. Device according to any one of claims 1, characterized in that the fibres are made of polyethylene.

7. Device according to any one of claims 1, characterized in that it comprises a fan designed to generate an upward flow of air, successively through the layered structure and in contact with the desiccant.

8. Device according to any one of claims 1, characterized in that the desiccant is calcium chloride in particulate form and contains a surfactant.

9. Device according to any one of claims 1, characterized in that the receptacle (10) for the desiccant comprises a series of vertical pockets with a perforated wall.

10. Device according to claim 9, characterized in that the pockets (10) contain an internal stiffening bracing (16).

* * * * *